US008665466B2

(12) United States Patent
Akiyoshi

(10) Patent No.: US 8,665,466 B2
(45) Date of Patent: Mar. 4, 2014

(54) IMAGE FORMING APPARATUS, PROGRAM UPDATING METHOD AND COMPUTER-READABLE STORAGE MEDIUM

(75) Inventor: Kunihiro Akiyoshi, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 1175 days.

(21) Appl. No.: 11/847,901

(22) Filed: Aug. 30, 2007

(65) Prior Publication Data

US 2008/0059960 A1  Mar. 6, 2008

(30) Foreign Application Priority Data

Sep. 1, 2006 (JP) ................................. 2006-237985
Aug. 22, 2007 (JP) ................................. 2007-216004

(51) Int. Cl.
*G06F 3/12* (2006.01)
*G06F 9/44* (2006.01)

(52) U.S. Cl.
USPC ....... 358/1.15; 358/1.13; 358/1.16; 358/1.17; 717/168; 717/169; 717/170; 717/171; 717/172; 717/173

(58) Field of Classification Search
CPC ..................................... G06F 8/70; G06F 8/71
See application file for complete search history.

(56) References Cited

U.S. PATENT DOCUMENTS 7,142,321 B2 * 11/2006 Tomita et al. ................. 358/1.15
7,392,518 B1 *  6/2008 Chhabra et al. ............... 717/168
7,516,450 B2 *  4/2009 Ogura .......................... 717/168
7,725,890 B2 *  5/2010 Kawaura ....................... 717/168
8,239,857 B2 *  8/2012 Osada ........................... 717/177
8,266,613 B2 *  9/2012 Bando et al. .................. 717/173
2002/0140966 A1 * 10/2002 Meade et al. ................. 358/1.15
2003/0163805 A1    8/2003 Hata et al.
2004/0145766 A1 *  7/2004 Sugishita et al. ............. 358/1.13
2005/0226641 A1   10/2005 Ando et al.
2006/0136899 A1 *  6/2006 Yoo .............................. 717/168

(Continued)

FOREIGN PATENT DOCUMENTS

JP    10-307726       11/1998
JP    2003-323301     11/2003

(Continued)

OTHER PUBLICATIONS

Office Action issued Apr. 3, 2012, in Japanese Patent Application No. 2007-216004.

(Continued)

*Primary Examiner* — Hilina K Demeter
(74) *Attorney, Agent, or Firm* — Oblon, Spivak, McClelland, Maier & Neustadt, L.L.P.

(57) ABSTRACT

An image forming apparatus which executes a program and updates the program, and is provided with an updating part configured to store a program prior to updating or a copy of the program prior to the updating and to generate an updating program by executing an updating process of the program, to thereby set the updating program as a boot target, a boot judging part configured to judge whether or not a booting of the updating program was successful and to record information indicating a result of judgement in a storage part, and a restoring part configured to confirm whether or not the booting of the updating program was successful based on the information, and to set the stored, program prior to the updating, as the boot target, if the booting of the updating program failed.

20 Claims, 8 Drawing Sheets

(56) References Cited

U.S. PATENT DOCUMENTS

| 2006/0184781 | A1* | 8/2006 | Inada et al. | 713/1 |
| 2006/0248162 | A1* | 11/2006 | Kawasaki | 709/217 |
| 2007/0094654 | A1* | 4/2007 | Costea | 717/168 |
| 2010/0169877 | A1* | 7/2010 | Ackerman et al. | 717/171 |

FOREIGN PATENT DOCUMENTS

| JP | 2004-348434 | 12/2004 |
| JP | 2005-215841 | 8/2005 |
| JP | 2005-269619 | 9/2005 |
| JP | 2006-298261 | 11/2006 |
| JP | 2007-133602 | 5/2007 |

OTHER PUBLICATIONS

Office Action issued Aug. 27, 2013, in Japanese Patent Application No. 2012-225623.

* cited by examiner

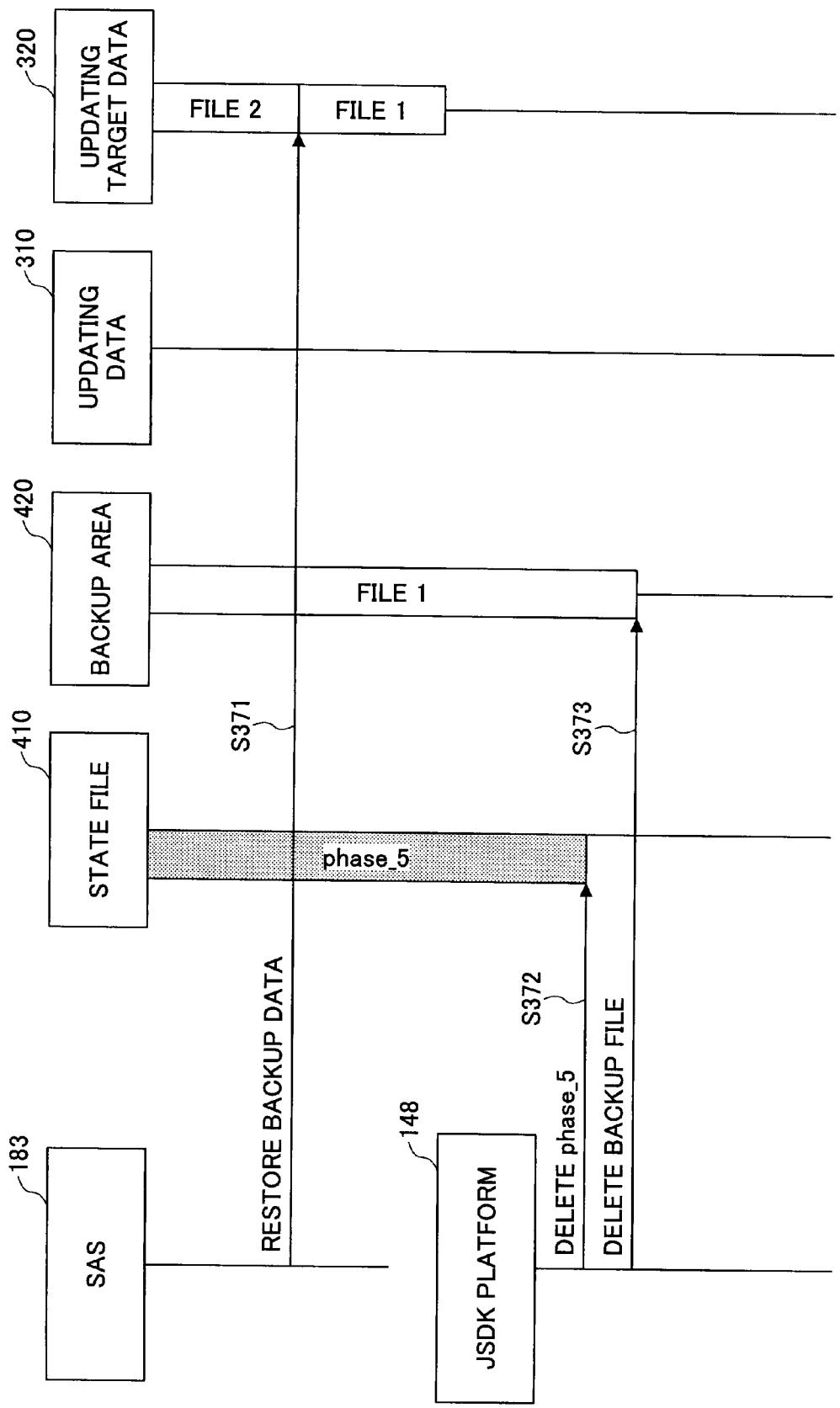

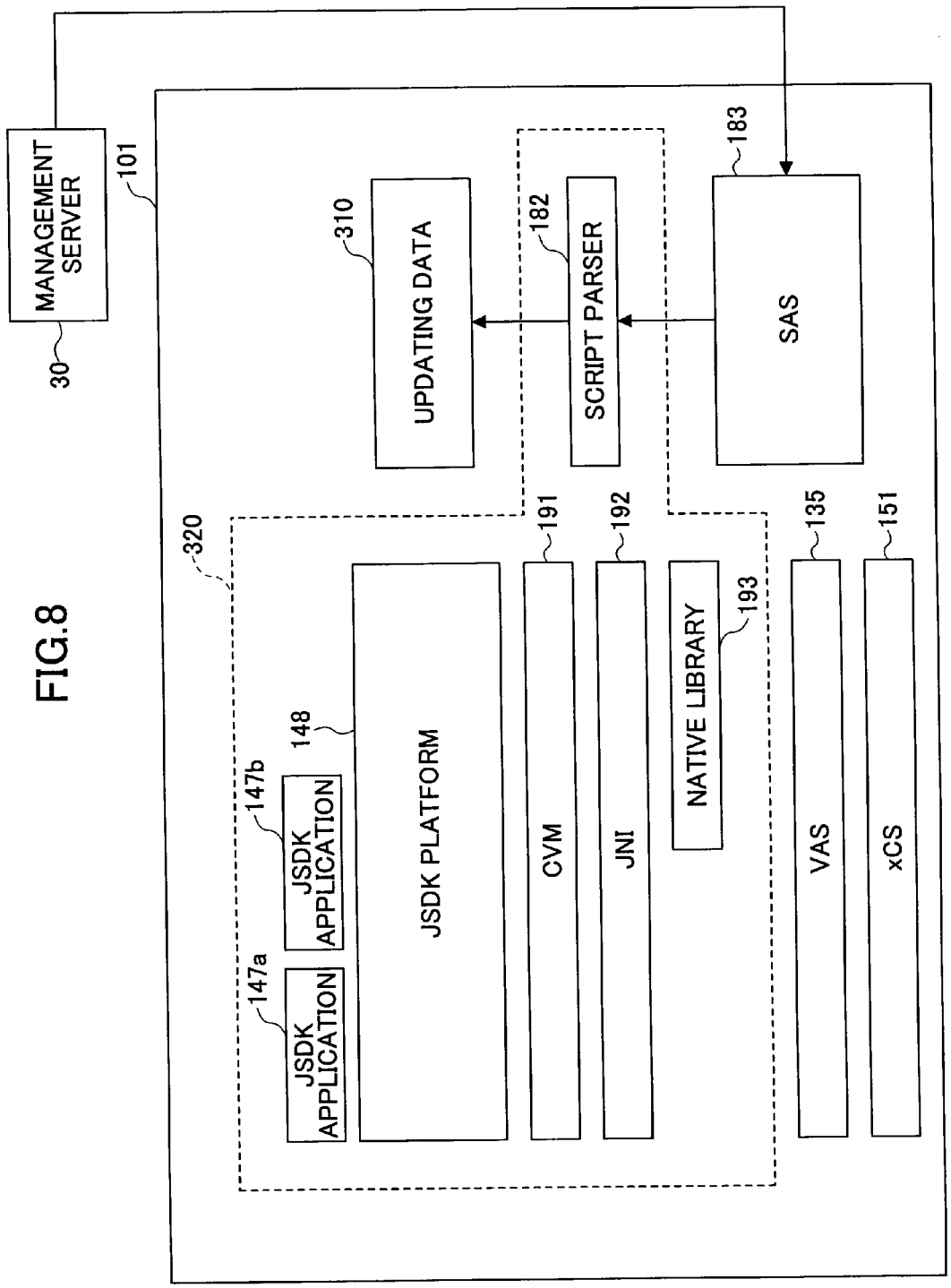

IMAGE FORMING APPARATUS, PROGRAM UPDATING METHOD AND COMPUTER-READABLE STORAGE MEDIUM

BACKGROUND OF THE INVENTION

1. Field of the Invention

The present invention generally relates to image forming apparatuses, program updating methods and computer-readable storage media, and more particularly to an image forming apparatus that updates a program thereof, a program updating method for such an image forming apparatus, and a computer-readable storage medium that stores a program for causing a computer to execute a program updating.

2. Description of the Related Art

In image forming apparatuses such as a printer, a copying machine, a scanner, a facsimile machine and a Multi-Function Peripheral (MFP), although there are restrictions on a memory or the like, a CPU is provided similarly as in the case of a general-purpose computer, and various functions are realized by controls performed by applications. The MFP realizes the functions the printer, the copying machine, the scanner and the facsimile machine within a single housing. Some of the image forming apparatuses are provided with a platform for implementing and executing the applications. After such an image forming apparatus is forwarded to a user, applications suited for an environment in which the user wishes to use the image forming apparatus are created and installed into the image forming apparatus, so as to provide a variety of versatile functions, as proposed in a Japanese Laid-Open Patent Application No. 2005-269619, for example.

When it is necessary to install or update the application of a plurality of image forming apparatuses or a remote image forming apparatus, an efficient way to install or update the application of a target image forming apparatus is to remotely install or update the application from a personal computer (PC) or the like that is connected to the target image forming apparatus via a network.

However, in the case of the remote installing or the remote updating, an install process or an update process (both hereinafter referred also referred to as "an updating process") is carried out in a background of the image forming apparatus. For this reason, the user who is operating the image forming apparatus, such as the user who is making a copying operation on the image forming apparatus, may not be aware that the updating process is simultaneously being carried out in the image forming apparatus. As a result, there is a possibility that the user will turn OFF the power of the image forming apparatus while the updating process is being carried out.

When the updating process is interrupted by the turning OFF of the power of the image forming apparatus, a file that is the target of the updating may be destroyed, and a mismatch may occur among a plurality of files that are related to the file that is the target of the updating. In such cases, there is a possibility that the image forming apparatus will no longer be able to operate in a normal manner.

On the other hand, even if the updating process itself is successfully carried out, an increase in the memory space occupied by the application after the updating may cause a lack of memory space when the image forming apparatus is thereafter booted. In such a case, the image forming apparatus may not be able to operate in a normal manner.

SUMMARY OF THE INVENTION

Accordingly, it is a general object of the present invention to provide a novel and useful image forming apparatus, program updating method and computer-readable storage medium, in which the problems described above are suppressed.

Another and more specific object of the present invention is to provide an image forming apparatus, a program updating method and a computer-readable storage medium, which enable a program updating process to be executed in an appropriate manner.

Still another object of the present invention is to provide an image forming apparatus which executes a program and updates the program, comprising an updating part configured to store a program prior to updating or a copy of the program prior to the updating, and to generate an updating program by executing an updating process of the program, to thereby set the updating program as a boot target; a boot judging part configured to judge whether or not a booting of the updating program was successful, and to record information indicating a result of judgement in a storage part; and a restoring part configured to confirm whether or not the booting of the updating program was successful based on the information, and to set the stored, program prior to the updating, as the boot target, if the booting of the updating program failed. According to the image forming apparatus of the present invention, it is possible to enable the program updating process to be executed in an appropriate manner.

A further object of the present invention is to provide a program updating method to be implemented in an image forming apparatus which executes a program and updates the program, the program updating method comprising an updating procedure storing a program prior to updating or a copy of the program prior to the updating, and generating an updating program by executing an updating process of the program, to thereby set the updating program as a boot target; a boot judging procedure judging whether or not a booting of the updating program was successful, and recording information indicating a result of judgement in a storage part; and a restoring procedure confirming whether or not the booting of the updating program was successful based on the information, and setting the stored, program prior to the updating, as the boot target, if the booting of the updating program failed. According to the program updating method of the present invention, it is possible to enable the program updating process to be executed in an appropriate manner.

Another object of the present invention is to provide a computer-readable storage medium which stores a program for causing a computer of an image forming apparatus to execute a program and update the program, the program comprising an updating procedure causing the computer to store a program prior to updating or a copy of the program prior to the updating, and to generate an updating program by executing an updating process of the program, to thereby set the updating program as a boot target; a boot judging procedure causing the computer to judge whether or not a booting of the updating program was successful, and to record information indicating a result of judgement in a storage part; and a restoring procedure causing the computer to confirm whether or not the booting of the updating program was successful based on the information, and to set the stored, program prior to the updating, as the boot target, if the booting of the updating program failed. According to the computer-readable storage medium of the present invention, it is possible to enable the program updating process to be executed in an appropriate manner.

Other objects and further features of the present invention will be apparent from the following detailed description when read in conjunction with the accompanying drawings.

BRIEF DESCRIPTION OF THE DRAWINGS

FIG. 7 is a sequence diagram for explaining a processing sequence of a recovery process; and FIG. 8 is a block diagram for generally explaining an updating process with respect to the image forming apparatus when a communication is made with a management server by a process other than that of a JSDK platform.

DESCRIPTION OF THE PREFERRED EMBODIMENTS

Figure 1:
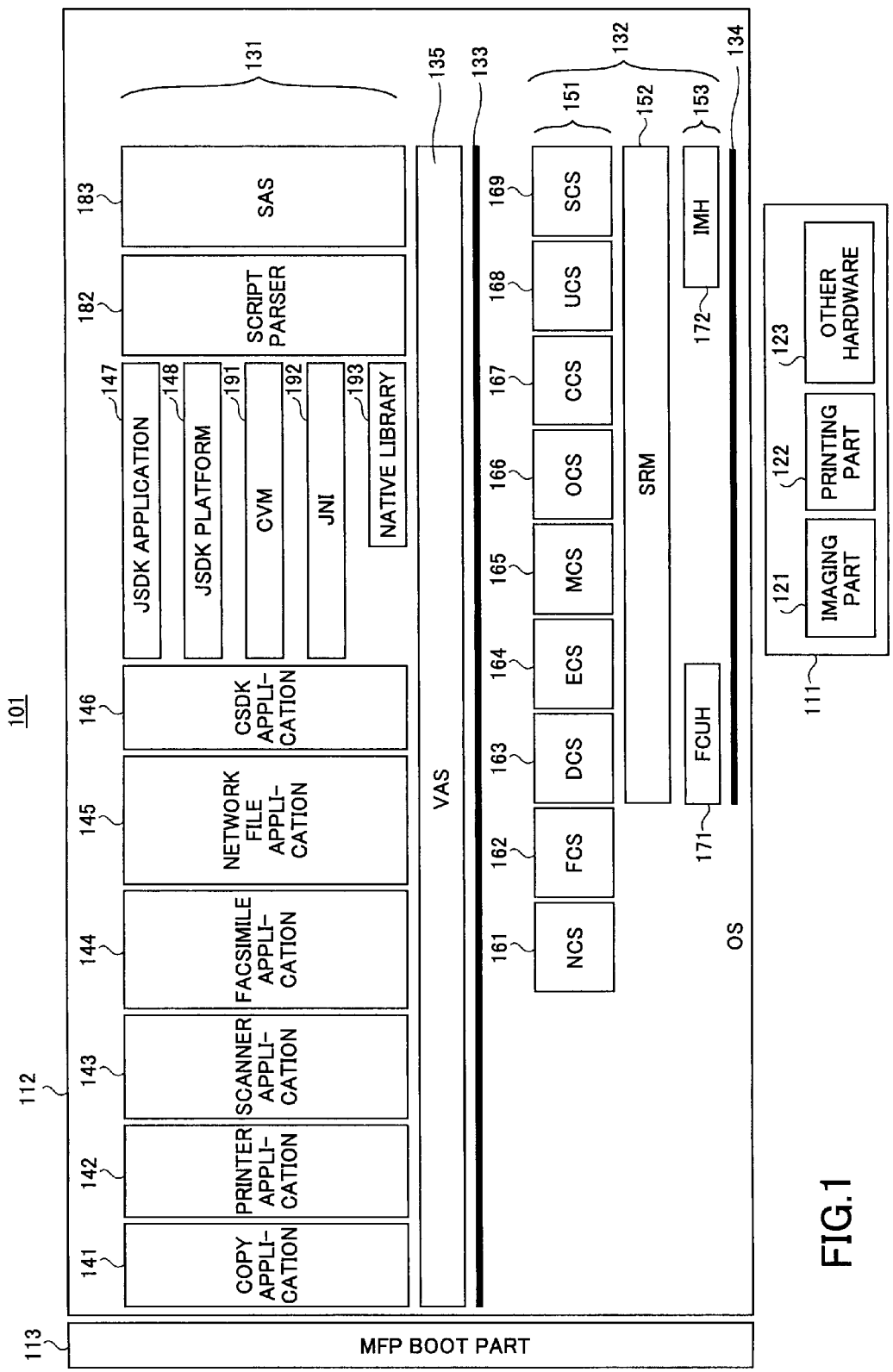
FIG. 1 is a diagram showing a functional structure of an image forming apparatus in an embodiment of the present invention.

A description will be given of embodiments of the image forming apparatus, the program updating method and the computer-readable storage medium according to the present invention, by referring to the drawings. FIG. 1 is a diagram showing a functional structure of the image forming apparatus in an embodiment of the present invention. In this embodiment, a Multi-Function Peripheral (MFP) 101 shown in FIG. 1 includes various hardware 111, various software 112, and a MFP boot part 113.

The hardware 111 of the MFP 101 includes an imaging part 121, a printing part 122, and other hardware 123. The imaging part 121 is a hardware for reading an image (image data) from a document that is to be read. The printing part 122 is a hardware for printing the image (image data) on a printing medium such as paper.

The software 112 of the MFP 101 includes various applications 131 and various platforms 132. Such software or programs are executed in parallel in units of processes by an Operating System (OS) such as a UNIX® OS.

The applications 131 include a copy application 141 for copying, a printer application 142 for printing, a scanner application 143 for scanning, a facsimile application 144 for facsimile transmission and reception, and a network file application 145 for network filing. The applications 131 further include a script parser 182, and an SDK Application Service (SAS) 183 that is a software for controlling a CSDK application 146 and a JSDK application 147.

The applications 131 may be developed using an exclusive or dedicated Software Development Kit (SDK). The application 131 that is developed using the SDK is called a SDK application. Dedicated SDKs that are provided include a "CSDK" for developing the application 131 by the C-language, and "JSDK" for developing the application 131 by the Java® language. The application 131 that is developed using the CSDK is referred to as a "CSDK application", and the application 31 that is developed using the JSDK is referred to as a "JSDK application". The MFP 101 shown in FIG. 1 includes the CSDK application 146 and the JSDK application 147. The MFP 101 shown in FIG. 1 further includes a JSDK platform 148 as the software 112 that provides an execution environment of the JSDK application 147 that is written in the Java language, and performs the intermediation between the JSDK application 147 and other software 112 that is written in the C-language. In addition, a Compact Virtual Machine (CVM) 191, a Java Native Interface (JNI) 192 and the like are provided as modules for realizing the execution environment of the application that is generally implemented by Java. Further, the MFP 101 further includes a Native Library 193 that is called by the JNI 192.

The platform 132 includes various control services 151, a system resource manager 152, and various handlers 153. The control services 151 include a Network Control Service (NCS) 161, a Facsimile Control Service (FCS) 162, a Delivery Control Service (DCS) 163, an Engine Control Service (ECS) 164, a Memory Control Service (MCS) 165, an Operation panel Control Service (OCS) 166, a Certificate Control Service (CCS) 167, a User directory Control Service (UCS) 168, and a System Control Service (SCS) 169. The handlers 153 include a Facsimile Control Unit Handler (FCUH) 171 and an Image Memory Handler (IMH) 172.

The process of the NCS 161 performs the intermediation of the network communication. The process of the FCS 162 provides the API of the facsimile. The process of the DCS 163 performs a control related to a distribution process stored documents. The process of the ECS 164 performs a control related to the imaging part 121 and the printing part 122. The process of the MCS 165 performs a control related to a memory and a hard disk drive (HDD). The process of the OCS 166 performs a control related to an operation panel. The process of the CCS 167 performs a control related to an authentication process and an accounting process. The process of the USC 168 performs a control related to a management of user information. The process of the SCS 169 performs a control related to a management of the system.

A Virtual Application Service (VAS) 135 is provided as the software 112 that performs the intermediation between the application 141 and the platform 132. The VAS 135 performs a server process by regarding the application 131 as a client, and performs a client process by regarding the platform 132 as a server. The VAS 135 includes a wrapping function for concealing the platform 132 when viewed from the application 132, and has a role of absorbing a version difference that is caused by updating the version of the platform 132.

The MFP boot part 113 is executed first when turning ON the power of the MFP 101. Hence, the UNIX OS or the like is booted, and the application 131 and the platform 132 are booted. Such programs are stored in the HDD or a memory card, and are reproduced from the HDD or the memory card and booted in the memory.

Figure 2:
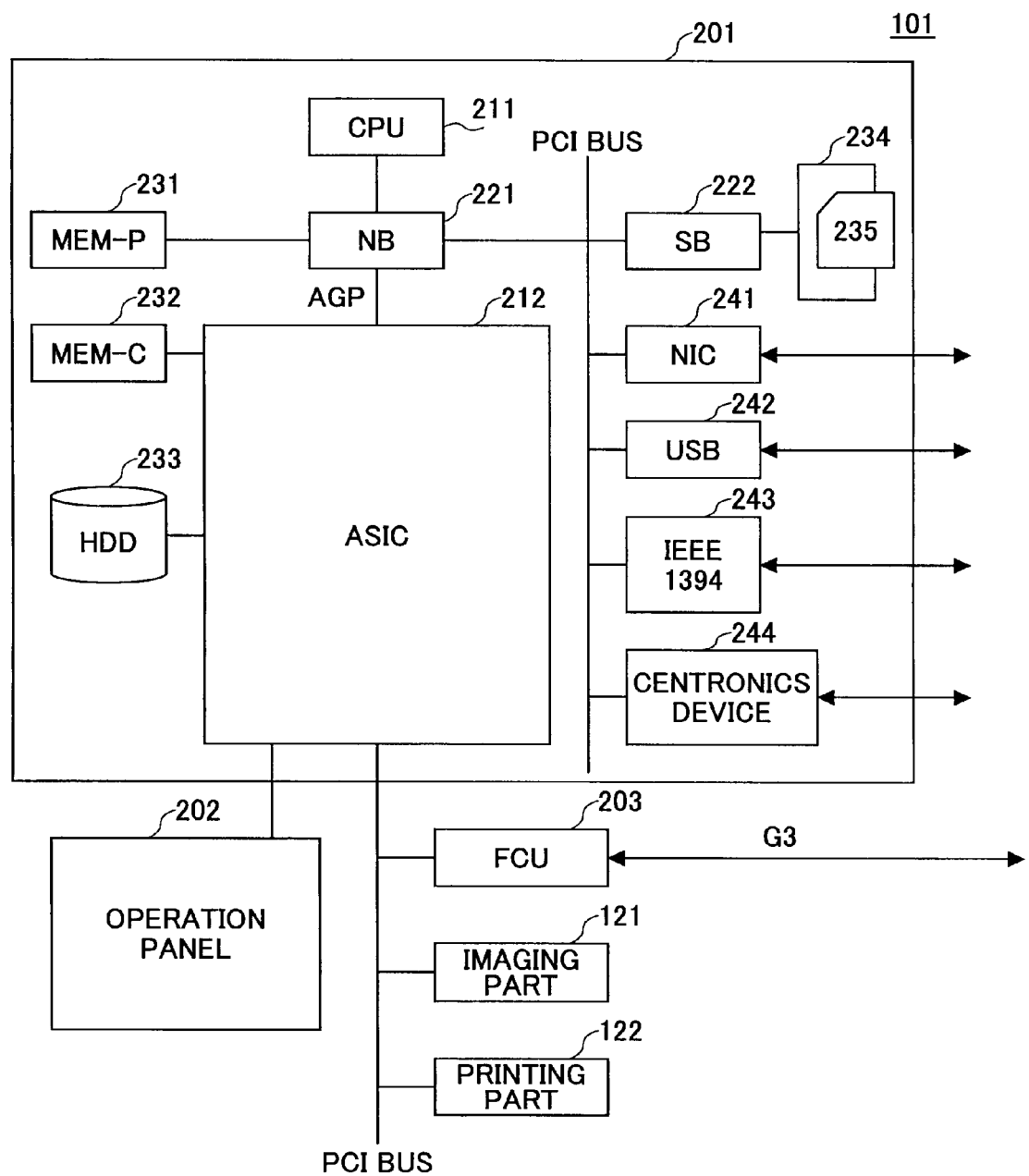
FIG. 2 is a diagram showing a hardware structure of the image forming apparatus in the embodiment of the present invention.

FIG. 2 is a diagram showing a hardware structure of the image forming apparatus in the embodiment of the present invention. The hardware 111 of the MFP 101 includes a controller 201, an operation panel 202, a Facsimile Control Unit (FCU) 203, the imaging part 121, and the printing part 122.

The controller 201 includes a CPU 211, an ASIC 212, an NB 221, an SB 222, a MEM-P 231, a MEM-C 232, an HDD 233, a memory card slot 234, a Network Interface Controller (NIC) 241, an USB device 242, an IEEE1394 device 243, and a Centronics device 244.

The CPU 211 is an IC for performing various information processing. The ASIC 212 is an IC for performing various image processing. The NB 221 is a north bridge of the controller 201. The SB 222 is a south bridge of the controller 201. The MEM-P 231 is a system memory of the MFP 101. The MEM-C 232 is a local memory of the MFP 101. The HDD 233 is a storage of the MFP 101. The memory card slot 234 is a slot to which a memory card 235 is set. The NIC 241 is a controller for network communication using the MAC address. The USB device 242 is a device for providing connection terminals in conformance with the USB standards. The IEEE1394 device 243 is a device for providing connection terminals in conformance with the IEEE1394 standards. The Centronics device 244 is a device for providing connection terminals in conformance with the Centronics specifications.

The operation panel 202 is a hardware (operation part) that is operated by an operator (user) to make inputs to the MFP 101, and is also a hardware (display part) for obtaining outputs from the MFP 101 to be confirmed (or monitored) by the operator.

A description will now be given of an example where an updating process (install, uninstall, update, etc.) of the application 131 is executed.

Figure 3:
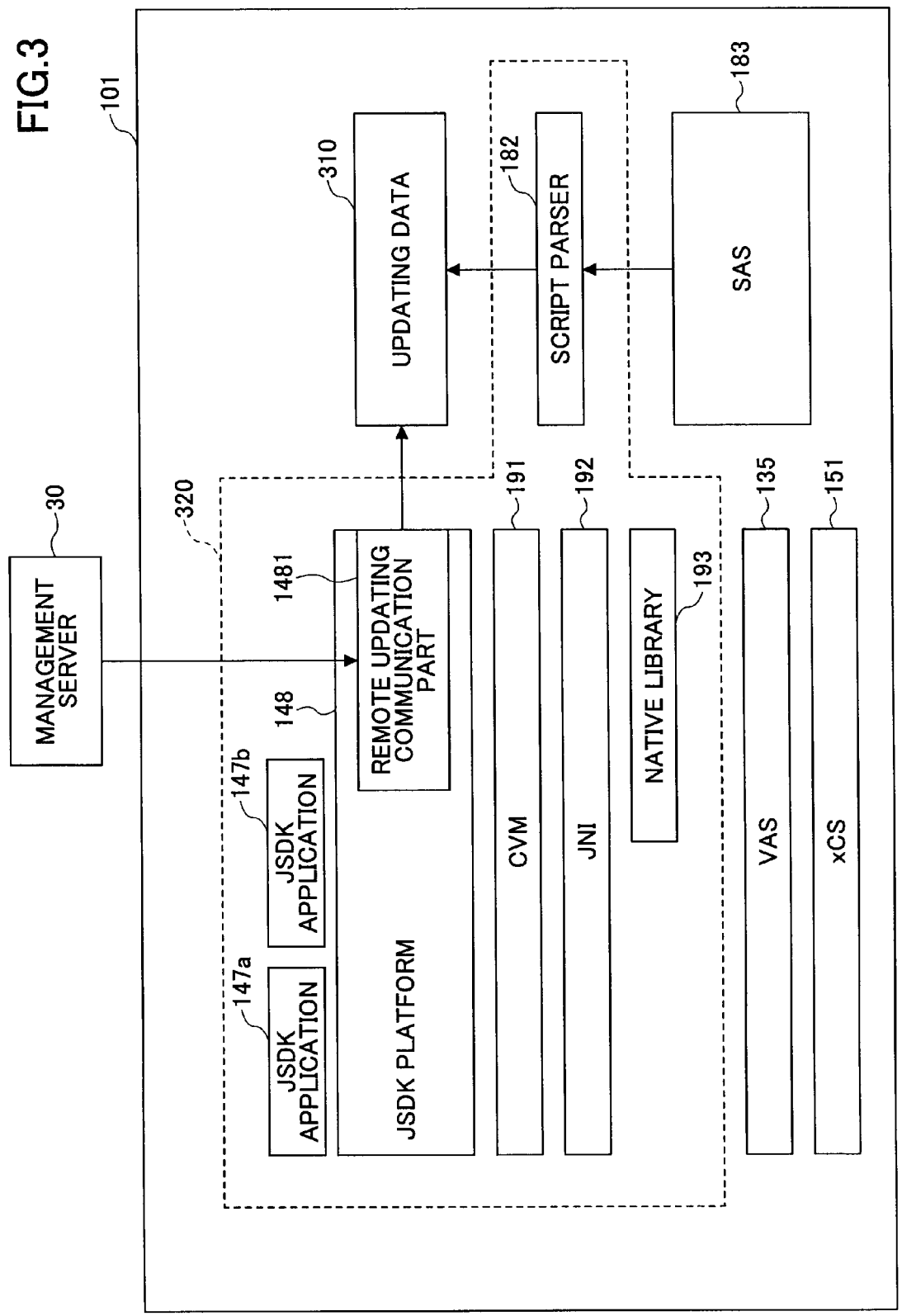
FIG. 3 is a block diagram for generally explaining an updating process with respect to the image forming apparatus of the embodiment.

FIG. 3 is a block diagram for generally explaining the updating process with respect to the image forming apparatus of the embodiment. In FIG. 3, those parts that are the same as those corresponding parts in FIG. 1 are designated by the same reference numerals, and a description thereof will be omitted.

In FIG. 3, a management server 30 connects to one or more image forming apparatus via the network, and manages the states and the like of each image forming apparatus. For example, the management server 30 is formed by a personal computer (PC). The management server 30 of this embodiment sends, with respect to the MFP 101, an instruction that instructs the MFP 101 to execute a remote updating process, and also sends data (updating data 310) necessary for the remote updating process to the MFP 101.

The instruction that instructs the execution of the remote updating process and the updating data 310 that are sent from the management server 30 are received by a remote updating communication part 1481 that forms a portion of the JSDK platform 148. The remote updating communication part 1481 stores the received updating data 310 in the HDD 233, the memory card 235 or the like of the MFP 101.

The updating data 310 includes, as the data necessary for the updating process, the application itself that is the target of the updating process, a script file written with execution information (for example, information indicating an updating portion, command forming the updating process, etc.) of the updating process, and the like that are compressed and stored therein.

The script parser 182 interprets the written contents of the script file that is stored in the updating data 310. The SAS 183 controls the entire updating process by executing the command that is interpreted by the script parser 182.

In FIG. 3, a portion surrounded by a dotted line 320 (hereinafter referred to as "an update target portion 320") indicates the portion that may become the update target of the remote updating process. In other words, the JSDK application 147, the JSDK platform 148, the CVM 191, the JNI 191, the Native Library 193, the script parser 182 and the like may become the update target.

Figure 4:
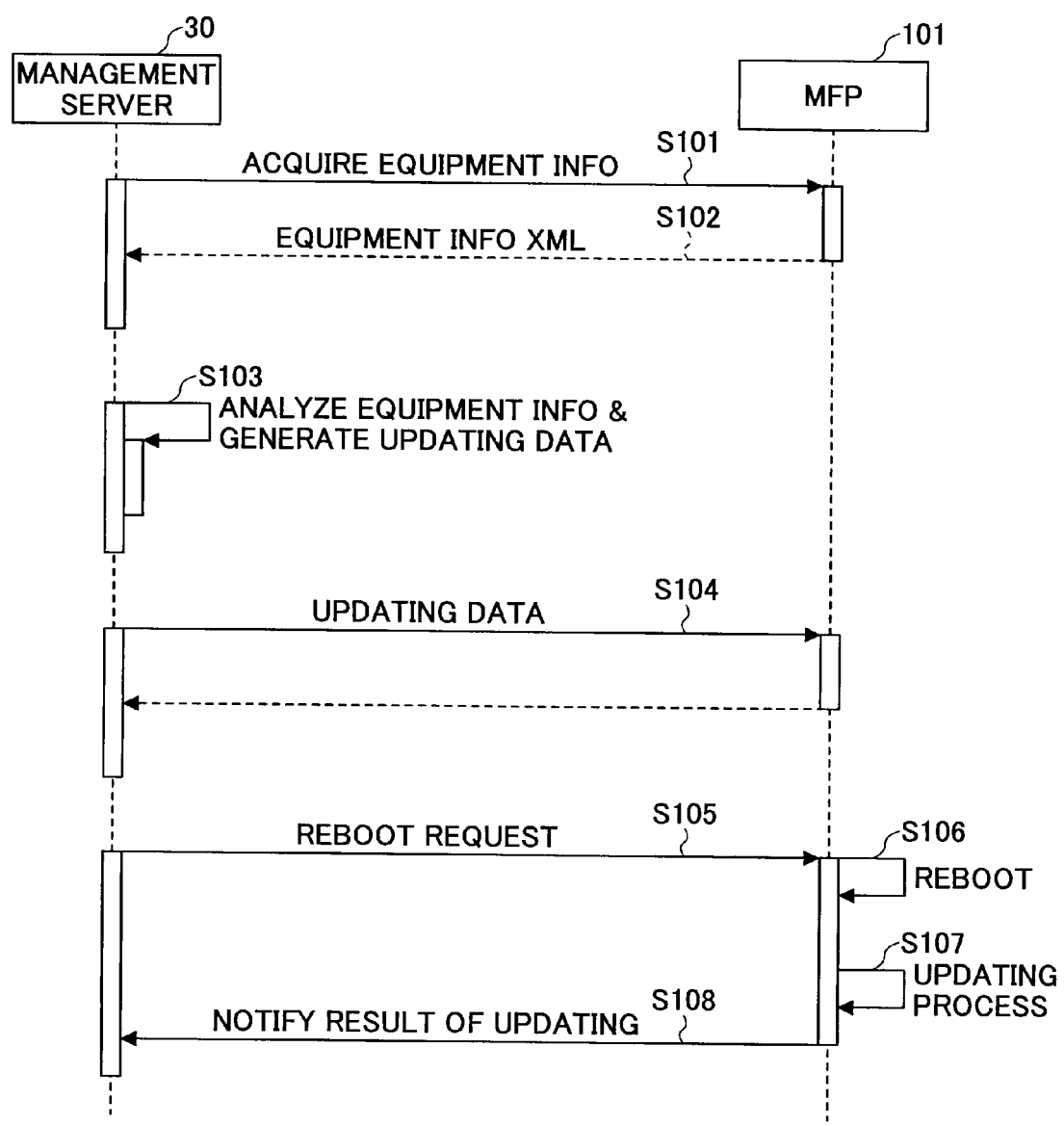
FIG. 4 is a sequence diagram for generally explaining the updating process with respect to the image forming apparatus of the embodiment.

Next, a description will be given of a processing procedure of the MFP 101. FIG. 4 is a sequence diagram for generally explaining the updating process with respect to the image forming apparatus of the embodiment.

For example, the management server 30 requests acquisition of equipment information with respect to the remote updating communication part 1481 of the MFP 101, in response to an input made by the user with respect to the management server 30 or, in response to an automatic or periodic trigger made by a program (step S101). The remote updating communication part 1481 collects the equipment information of the MFP 101, and returns the equipment information to the management server 30 after converting the data format of the equipment information into the XML (eXtensible Markup Language) format (step S102). The equipment information includes a serial number of the MFP 101, a vacant or available memory capacity, version information of the JSDK platform 148, and information related to the software structure such as application information of the JSDK application 147 that has already been installed. The application information of each JSDK application 147 includes a product ID that is unique to each application, version information, information indicating an installed location (for example, path name), and the like.

When the management server 30 receives the equipment information, the management server 30 analyzes the equipment information, judges a module (the JSDK platform 148, the JSDK application 147, etc.) that is to be updated, and generates the updating data 310 from contents that are dependent upon a result of this judgement (step S103). For example, in a case where a new version is registered in the management server 30 for one of the applications 131 installed in the MFP 101 or, an application that is not installed in the MFP 101 is registered in the management server 30, the application having the new version or, the application that is not installed, is included in the updating data 310. Next, the management server 30 sends the updating data 310, that is generated by the management server 30, to the MFP 101 (step S104). The remote updating communication part 1481 of the MFP 101 receives the updating data 310, and stores the updating data 310 in the HDD 233 or the memory card 235. A storage region where the updating data 310 is stored will hereinafter be referred to as "an updating data storage region". Thereafter, the management server 30 sends a reboot (restart) request to the MFP 101 (step S105).

In response to the reboot request from the management server 30, the MFP 101 executes the reboot (step S106). By this execution of the reboot, the power of the MFP 101 is turned OFF, and the MFP 101 executes the updating process based on the updating data 310 in the continuing process of executing the reboot (step S107). However, if a job is being executed (for example, if a copying process is being executed), the execution of the reboot is waited or avoided.

When the updating process is completed, the MFP 101 notifies (sends) a result of the updating process (information indicating whether or not the updating process was successful) to the management server 30 (step S108). If the updating process failed, information indicating the cause of the failure is also sent together with the result of the updating process. Based on the notification from the MFP 101, the management server 30 can confirm whether or not the updating process was successful, and the management server 30 can thus appropriately manage the versions of the programs running on the MFP 101.

The result of the updating process does not need to be notified (sent) actively from the MFP 101. For example, the management server 30 may periodically inquire the result of the updating process by performing a polling after the reboot request, so that the MFP 101 responds to the inquiry by returning the result of the updating process.

In FIG. 4, the MFP 101 sends the equipment information in response to the request from the management server 30. However, the MFP 101 may actively send the equipment information to the management server 30, so that the processes of the step S103 and the subsequent steps are executed using this equipment information as a trigger.

Figure 5:
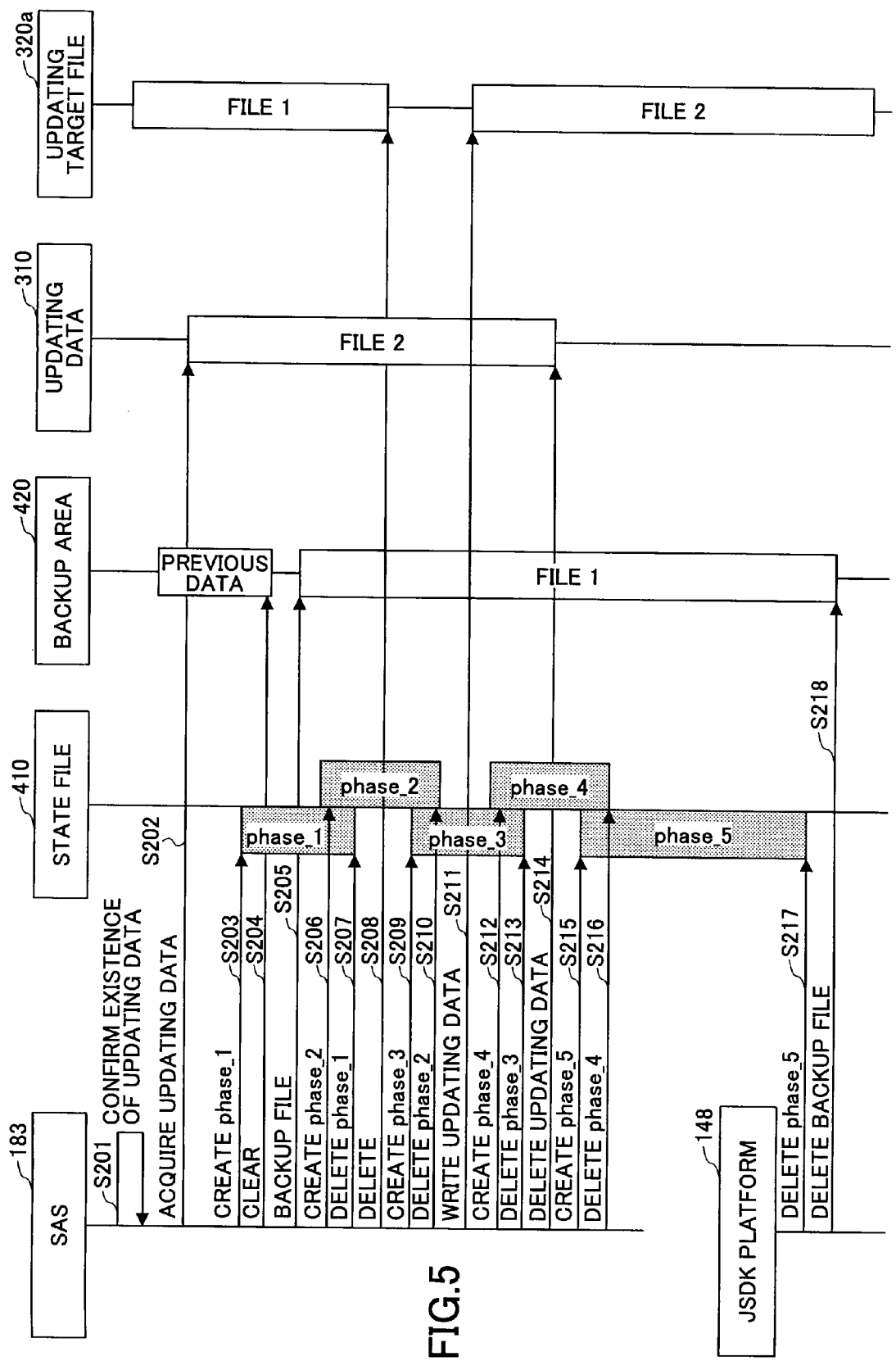
FIG. 5 is a sequence diagram for explaining a boot process of a Multi-Function Peripheral (MFP)

Next, a description will be given of the process that is carried out in the step S107 when the MFP 101 is booted by the reboot. FIG. 5 is a sequence diagram for explaining the boot process of the MFP 101.

In the boot process of the MFP 101, the SAS 183 is booted as a process or thread at least before the update target portion 320. Of the update target portion 320 or the programs that are affected as to whether or not to be booted depending on the updating process, the programs are booted as the process or thread in a sequence CVM 191→JSDK platform 148→JSDK application 147a. However, the JSDK application 147a is not booted in the process of rebooting the MFP 101, and is rebooted when the execution of the JSDK application 147a is instructed. Accordingly, of the programs that are affected as to whether or not to be booted depending on the updating process in this embodiment, the JSDK platform 148 is the program that is booted last of the programs that are booted following the updating process.

When the SAS 183 is booted, the SAS 183 confirms the existence of the updating data 310 in the updating data storage region (step S201). If the updating data 310 does not exist in the updating data storage region, the updating process of the step S202 and the subsequent steps is not executed, and a normal boot process is executed. On the other hand, if the updating data 310 exists in the updating data storage region, the SAS 183 acquires and expands or decodes the updating data 310 (step S202). The process is executed thereafter by interpreting, by the script parser 182, the written contents of the script file that is included in the decoded updating data 310.

First, the SAS creates, as a state file 410, a file having a file name "phase_1" in a predetermined storage region (hereinafter referred to as a "state file recording region") of the HDD 233 or the memory card 235. A file having a file name "phase_x" will hereinafter be referred to as a "phase_x file".

The state file 410 is a file for recording and identifying the progress (or completion state) of the updating process, and the file name itself is identification information (progress information) of the progress of the updating process. Accordingly, when the phase_1 file is created in the step S203, it means that the starting of the phase 1 process has been recorded.

Next, the SAS 183 deletes, from a backup area 420, a backup file that was created by the previous updating process (step S204). The backup area 420 refers to a storage region where the file that is the updating target is saved, and is formed by the HDD 233 or the memory card 235, for example. In addition, the backup file refers to a file that is saved in the backup area 420.

Then, the SAS 183 executes a backup by copying a file that is the updating target of the present updating process (updating target file 320a) to the backup area 410 to generate a copy of the updating target file 320a (step S205). When the backup is completed in a normal manner, the SAS 183 creates a phase_2 file as the state file 410 (step S206), and deletes the phase_1 file if the phase_1 file exists (step S207). When the phase_2 file is created and the phase_1 file is deleted, it means that the starting of the phase 2 process and the completion of the phase 1 process (backup of the updating target file 320a) have been recorded.

Thereafter, the SAS 183 deletes the updating target file 320a that is overwritten by the updating process (step S208). When the deletion of the updating target file 320a is completed in a normal manner, the SAS 183 creates a phase_3 file as the state file 410 (step S209), and deletes the phase_2 file if the phase_2 file exists (step S210). When the phase_3 file is created and the phase_2 file is deleted, it means that the starting of the phase 3 process and the completion of the phase 2 process (deletion of the updating target file 320a) have been recorded.

Next, the SAS 183 copies the updating data 310 that is stored in the updating data storage region to a target path (location where the installing is to be made), and generates the program included in the updating data 310 as a boot target (step S211). When the copying of the updating data 310 is completed in a normal manner, the SAS 183 creates a phase_4 file as the state file 410 (step S212), and deletes the phase_3 file if the phase_3 file exists (step S213). When the phase_4 file is created and the phase_3 file is deleted, it means that the starting of the phase 4 process and the completion of the phase 4 process (copying of the updating target file 320a) have been recorded.

Then, the SAS 183 deletes the updating data 310 from the updating data storage region (step S214). When the deletion of the updating data 310 is completed in a normal manner, the SAS 183 creates a phase_5 file as the state file 410 (step S215), and deletes the phase_4 file if the phase_4 file exists (step S216). When the phase_4 file is deleted, it means that the completion of the phase 4 process (deletion of the updating data 310) has been recorded.

In this embodiment, the updating process is completed by the completion of the phase 4 process. Thereafter, as a normal boot process, the programs are booted as the process or thread in a sequence CVM 191→JSDK platform 148. After being booted, the JSDK platform 148 confirms the existence of a phase_5 file, and deletes the phase_5 file if the phase_5 file exists, so as to update the progress information (step S217). The phase_5 file is deleted only when both the CVM 191 and the JSDK platform 148 which are updated by the updating process or, affected by the updating process as to whether or not the booting can be made. Accordingly, when the phase_5 file is deleted, it means that the booting of both the CVM 191 and the JSDK platform 148 in the normal manner has been recorded. In other words, the JSDK platform 148 judges whether or not the booting of the updated program was successful, and records the result of this judgment.

Next, the JSDK platform 148 deletes the backup file that is saved in the backup area 420 (step S218).

When the booting fails, the JSDK platform 138 stores information indicating the cause of the failure (contents of exceptions generated within the program, etc.) in an error information file, and stores the error information file in the HDD 233. The error information file is sent to the management server 30 as information indicating the result of the updating, in the step S108 shown in FIG. 4. In the management server 30, it is possible to understand the cause of the failure of the updating process and to judge how a retry should be made, based on the contents of the error information file.

Figure 6:
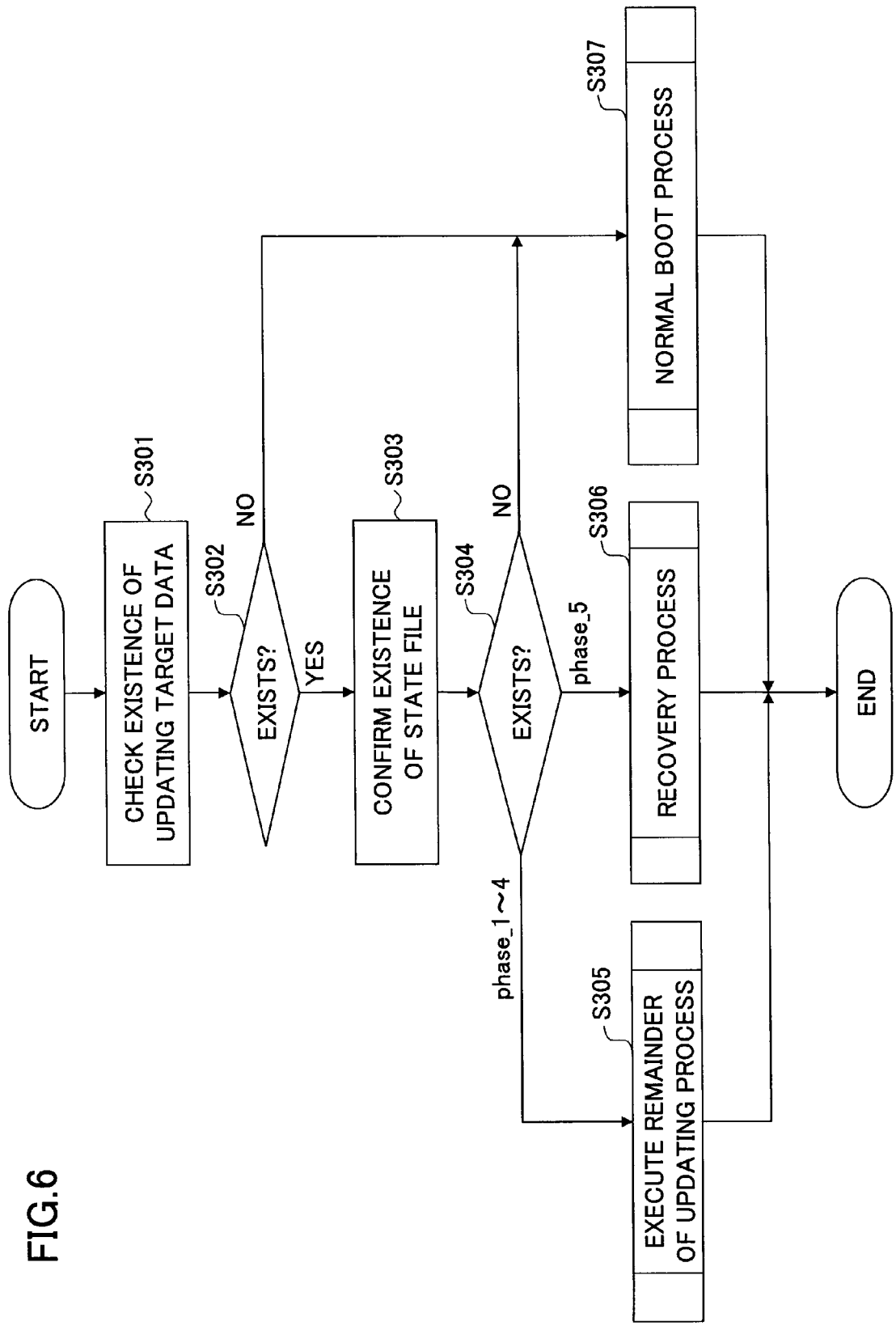
FIG. 6 is a flow chart for explaining a boot process of the MFP when the updating process does not end normally and the MFP is rebooted.

The updating process is interrupted if the user turns OFF the power of the MFP 101 or, a power failure occurs during the updating process. A description will now be given of the processing procedure for such cases when the power of the MFP 101 is turned ON again. FIG. 6 is a flow chart for explaining a boot process of the MFP 101 when the updating process does not end normally and the MFP 101 is rebooted.

When the MFP 101 is rebooted, the SAS 183 confirms the existence of the updating data 310 in the updating data storage region (step S301). If the updating data 310 does not exist in the updating data storage region (NO in step S302), a normal boot process is executed (step S307). The process of the step S301 corresponds to the process of the step S201 shown in FIG. 5. In other words, the SAS 183 not only confirms the existence of the updating data 310 when the MFP 101 is booted by the reboot, but also when the power of the MFP 101 is turned ON by the user. Accordingly, even if the reboot process of the step S106 shown in FIG. 4 is avoided, the process shown in FIG. 5 is executed when the power of the MFP 101 is thereafter turned ON.

On the other hand, if the updating data 310 exists in the updating data storage region (YES in step S302), the SAS 183 confirms the existence of the state file 410 in the state file recording region (step S303). In a case where one of the phase_1 file through phase_4 file exists in the state file recording region (phase_1 through phase_4 in step S304), it means that the updating process has not yet been completed. Hence, of the updating process shown in FIG. 5, the SAS 183 executes a remaining process that has not yet been executed, depending on the file name of the remaining state file 410 (step S305).

More particularly, if only the phase_1 file remains, the SAS 183 executes the step S203 and the subsequent steps. If only the phase_2 file remains, the SAS 183 executes the step S208 and the subsequent steps. If the phase_2 file and the phase_1 file remain, the SAS 183 executes the step S207 and the subsequent steps. If only the phase_3 file remains, the SAS 183 executes the step S211 and the subsequent steps. If the phase_3 file and the phase_2 file remain, the SAS 183 executes the step S210 and the subsequent steps. If only the phase_4 file remains, the SAS 183 executes the step S214 and the subsequent steps. If the phase_4 file and the phase_3 file remain, the SAS 183 executes the step S213 and the subsequent steps.

In addition, if the phase_5 file exists in the step S304, it may be that the updating process is completed but the booting of the CVM 191 or the JSDK platform 148 has failed due to some cause (for example, destruction of file, lack of resources such as memory, etc.). This is because the phase_5 file is deleted only when the booting of the JSDK platform 148 is successful. Hence, in this case, the MFP 101 executes a recovery process (step S306). A description on the details of the recovery process will be given later in the specification.

If no state file 410 exists in the step S304, it means that the updating process is executed in a normal manner, and the CVM 191 and the JSDK platform 148 are also booted in a normal manner. Accordingly, the MFP 101 in this case executes a normal boot process (step S307).

Next, a more detailed description will be given of the recovery process of the step S307 shown in FIG. 6. FIG. 7 is a sequence diagram for explaining a processing sequence of the recovery process.

When the existence of the phase_5 file in the state file recording region is detected, the SAS 183 restores the backup file that is saved in the backup area 420 (step S371). That is, by copying the backup file back to its original location, the state of the updating target data 320 is returned to its original state before the updating process was executed, and the program before the updating is set as the boot target.

Next, as a normal boot process, the programs are booted as the process or thread in a sequence CVM 191→JSDK platform 148. Since the CVM 191, the JSDK platform 148 and the like are restored back to their original states where the programs were booted in a normal manner, the possibility of the CVM 191, the JSDK platform 148 and the like being booted in a normal manner is high. The JSDK platform 148, after being booted, confirms the existence of the phase_5 file (step S372), and deletes the phase_5 file if the phase_5 file exists (step S373). Then, the JSDK platform 148 deletes the backup file in the backup area 420 (step S373).

As described above, according to the MFP 101 of this embodiment, the progress of the updating process is managed based on the state file 410. Hence, even if the updating process is interrupted for some reason, it is possible to identify the process which could not be executed and to execute the remaining process when the power of the MFP 101 is turned ON again.

In addition, the MFP 101 detects that the CVM 191, the JSDK platform 148 and the like could not be booted due to the file destruction, the lack of resources and the like, based on the phase_5 file, and executes the recovery process. For this reason, it is possible to carry out the operation at least from the state before the updating process was executed. The program that is the updating target in this embodiment in particular is a program that provides (realizes) the execution environment of the application. Therefore, by appropriately recovering the state of such a program, it is possible to avoid a fatal situation where the application of the MFP 101 becomes inoperable.

The JSDK platform 148 is a program that includes the remote updating communication part 1481 that communicates with the management server 30 in the remote updating process. Accordingly, if the JSDK platform 148 cannot be booted, it is impossible to send the updating data 310 to the MFP 101 by executing the remote updating process again. This embodiment is particularly effective in situations where a portion that carries out the communication function in the remote updating process may become the updating target. The judgement to determine whether or not the recovery process is required (that is, the check to determine the existence of the phase_5 file) and the recovery process may not only be executed when rebooting the MFP 101 after executing the updating process, but also after a predetermined time elapses when carrying out the updating process.

In this embodiment, the file name of the state file 410 is used as the information for managing the progress of the updating process. However, the information for managing the progress of the updating process is not limited to the file name of the state file 410. For example, the progress may be written within a single file. However, according to the method of successively writing the progress within the single file, the file may be destroyed if the power of the MF 101 is turned OFF during the writing of the progress, and in such a case, it becomes impossible to identify the progress when executing the reboot. For this reason, in order to avoid such inconvenience, this embodiment manages the progress by a procedure of constantly creates the state file 410 of the next phase before deleting the state file 410 of the previous phase, depending on the progress of the phase of the updating process. As long as such a procedure is followed, it is not essential to write the information for managing the progress of the updating process within the file, and it is possible instead to record flag information that indicates the phase into a non-volatile memory such as an NVRAM.

The file name of the state file 410 may be enciphered based on the serial number, model number or the like of the MFP 101, so that it is possible to prevent unauthorized monitoring of the progress of the updating process from the file name of the state file 410 and to prevent unauthorized copying by unauthorized rewriting of the file name of the state file 410.

In this embodiment, the state prior to the updating is backed up by generating the copy of the file that is the updating target. However, the backup method is not limited to that described above. For example, the state prior to the updating may be substantially backed up by generating a file (program) after the updating in a storage region that is different from that of the file that is the updating target. In other words, the updating process should be executed in a state where the file (program) prior to the updating is saved.

In the embodiment described above, the remote updating communication part 1481 of the JSDK platform 148 included in the updating target data 320 communicates with the management server 30 when receiving the updating data 310 or the like. However, the communication with the management server 30 may be executed by a program that is booted as a process different from the JSDK platform 148.

FIG. 8 is a block diagram for generally explaining an updating process with respect to the image forming apparatus when a communication is made with a management server by a process other than that of a JSDK platform. In FIG. 8, the SAS 183, which is a process different from that of the JSDK platform 148, communicates with the management server 30 to receive the updating data 310 or the like. Hence, the JSDK platform 148 does not require the remote updating communication part 1481.

In this case, the SAS 183 stops the process of each program included in the updating target data 310 depending on the reception of the updating data 310, and executes the updating process in this state based on the interpretation of the script file by the script parser 182. After the updating process is completed, the SAS 183 reboots the stopped process. If the booting of the JSDK platform 148 fails when rebooting the process, the SAS 183 stops the process that was booted before the JSDK platform 148, and executes the recovery process before booting the process again.

Therefore, in this case, as long as it is possible to guarantee the sage stopping of each process, the rebooting of the MFP 101 (reboot request from the management server 30) becomes unnecessary. If is of course possible to realize the functions of the SAS 183 shown in FIG. 8 by a program (process) exclusively for the updating process.

In FIG. 8, the backup file may be stored in the management server 30 instead of within the MFP 101. In this case, the SAS 183 may send the backup file to the management server 30.

The script parser 182 may be implemented as a plug-in with respect to a program that executes the updating process (the SAS 183 in this embodiment). By implementing the script parser 182 as the plug-in, it becomes possible to flexibly cope with changes in the specification of the written contents of the script file.

This application claims the benefit of a Japanese Patent Application No. 2006-237985 filed Sep. 1, 2006 and a Japanese Patent Application No. 2007-216004 filed Aug. 22, 2007, in the Japanese Patent Office, the disclosures of which are hereby incorporated by reference.

Further, the present invention is not limited to these embodiments, but various variations and modifications may be made without departing from the scope of the present invention.

What is claimed is:

1. An apparatus which executes a program and updates the program, comprising:
a specifying part configured to specify a module to be updated or a program to be installed by transmitting equipment information of the apparatus, the equipment information including information of equipment that operates the program to be installed or an installed program;
an updating part configured to receive updating data, based on the equipment information, to store a program prior to an updating or a copy of the program prior to the updating, and to generate an updated program by executing an updating process of the program prior to the updating, to thereby set the updated program as a boot target;
a progress information recording part configured to record progress information of the updating process in a storage part, wherein the progress information recording part records the progress information by recording information that indicates a start of each phase of plural phases forming the updating process of the program upon the start of the respective phase and deleting the information indicating the start of the respective phase upon completion of the respective phase;
a boot judging part configured to judge whether a booting of the updated program was successful, and to record information indicating a result of a judgment in the storage part; and
a restoring part configured to confirm whether the booting of the updated program was successful based on the information, and to execute a normal boot process when the updating data does not exist, wherein
the restoring part is further configured to execute, by confirming or referring to the progress information, a remaining updating process or a recovery process when the updating data does exist, and to set the stored program prior to the updating as the boot target, if the booting of the updated program failed,
when the transmitted equipment information includes a program having a version different from a version of the program registered in a server, the received updating data includes the program, and
when the transmitted equipment information does not include a program that is registered in the server, the received updating data includes the program to be newly installed in the apparatus.

2. The apparatus as claimed in claim 1, wherein the program updated by the updating part provides an execution environment of applications.

3. The apparatus as claimed in claim 1, wherein the restoring part confirms whether the booting of the updated program was successful based on the information indicating the result of the judgment when the apparatus is booted again after executing the updating process.

4. The apparatus as claimed in claim 1, wherein the progress information recording part further records information indicating a start of a phase next to the completed phase, and thereafter deletes the information indicating the start of the completed phase.

5. The apparatus as claimed in claim 1, wherein a remainder of the updating process is executed based on the progress information if the apparatus is booted again after the updating process executed by the updating part is interrupted.

6. The apparatus as claimed in claim 2, wherein the updating part receives the updating data in response to the transmission of the equipment information.

7. The apparatus as claimed in claim 6, wherein the equipment information is at least one of a product ID that is unique to one of the applications, version information of one of the applications, and a path name of one of the applications.

8. The apparatus as claimed in claim 7, wherein the equipment information is at least one of the product ID and the version information, and the updating data includes an application.

9. The apparatus as claimed in claim 1, wherein the equipment information is at least one of a serial number of the apparatus, a vacant or available memory capacity of the apparatus, and version information of the program prior to the updating.

10. The apparatus claimed in claim 1, wherein
each of the plural phases forming the updating process of the program is a sub-process forming a part of the updating process, and
the progress information recording part records information that indicates a start of execution of each sub-process when execution of the respective sub-process begins and deletes the information indicating the start of the execution of the respective sub-process when execution of the respective sub-process is completed.

11. A program updating method to be implemented in an apparatus which executes a program and updates the program, said program updating method comprising:
specifying a module to be updated or a program to be installed by transmitting equipment information of the apparatus, the equipment information including information of equipment that operates the program to be installed or an installed program;
receiving updating data, based on the equipment information;
storing a program prior to an updating or a copy of the program prior to the updating, and generating an updated program by executing an updating process of the program prior to the updating, to thereby set the updated program as a boot target;
recording progress information of the updating process in a storage part, wherein the recording includes recording the progress information by recording information that indicates a start of each phase of plural phases forming the updating process of the program upon the start of the respective phase and deleting the information indicating the start of the respective phase a upon completion of the respective phase;
judging whether a booting of the updated program was successful, and recording information indicating a result of a judgment in the storage part;
executing a normal boot process when the updating data does not exist;
confirming whether the booting of the updated program was successful based on the information;
executing, by confirming or referring to the progress information, a remaining updating process or a recovery process when the updating data does exist; and
setting the stored program prior to the updating as the boot target, if the booting of the updated program failed, wherein
when the transmitted equipment information includes a program having a version different from a version of the program registered in a server, the received updating data includes the program, and
when the transmitted equipment information does not include a program that is registered in the server, the received updating data includes the program to be newly installed in the apparatus.

12. The program updating method as claimed in claim 11, wherein the program updated by the updating process provides an execution environment of applications.

13. The program updating method as claimed in claim 11, wherein the confirming confirms whether the booting of the updated program was successful based on the information indicating the result of the judgment when the apparatus is booted again after executing the updating process.

14. The program updating method as claimed in claim 11, wherein the recording progress information includes recording information indicating a start of a phase next to the completed phase, and thereafter deleting the information indicating the start of the completed phase.

15. The program updating method as claimed in claim 11, wherein a remainder of the updating process is executed based on the progress information if the apparatus is booted again after the updating process is interrupted.

16. A non-transitory computer-readable storage medium which stores a program for causing a computer of an apparatus to execute a method comprising:
specifying a module to be updated or a program to be installed by transmitting equipment information of the apparatus, the equipment information including information of equipment that operates the program to be installed or an installed program;
receiving updating data, based on the equipment information;
causing the computer to store a program prior to an updating or a copy of the program prior to the updating, and to generate an updated program by executing an updating process of the program prior to the updating, to thereby set the updated program as a boot target;
causing the computer to record progress information of the updating process in a storage part, wherein the causing the computer to record includes causing the computer to record the progress information by recording information that indicates a start of each phase of plural phases forming the updating process of the program upon the start of the respective phase and delete the information indicating the start of the respective phase upon completion of the respective phase;
causing the computer to judge whether a booting of the updated program was successful, and to record information indicating a result of a judgment in the storage part;
causing the computer to execute a normal boot process when the updating data does not exist, and to execute, by confirming or referring to the progress information, a remaining updating process or a recovery process when the updating data does exist; and
causing the computer to confirm whether the booting of the updated program was successful based on the information, and to set the stored program prior to the updating as the boot target, if the booting of the updated program failed, wherein
when the transmitted equipment information includes a program having a version different from a version of the program registered in a server, the received updating data includes the program, and
when the transmitted equipment information does not include a program that is registered in the server, the received updating data includes the program to be newly installed in the apparatus.

17. The non-transitory computer-readable storage medium as claimed in claim 16, wherein the program updated by the updating process provides an execution environment of applications.

18. The non-transitory computer-readable storage medium as claimed in claim 16, wherein the causing the computer to confirm causes the computer to confirm whether the booting of the updated program was successful based on the information indicating the result of the judgment when the apparatus is booted again after executing the updating process.

19. The non-transitory computer-readable storage medium as claimed in claim 16, wherein said causing the computer to record the progress information includes causing the computer to record information indicating a start of a phase next to the completed phase, and to thereafter delete the information indicating the start of the completed phase.

20. The non-transitory computer-readable storage medium as claimed in claim 16, wherein a remainder of the updating process is executed based on the progress information if the apparatus is booted again after the updating process is interrupted.

* * * * *